(12) United States Patent
Zhou

(10) Patent No.: US 7,747,789 B2
(45) Date of Patent: Jun. 29, 2010

(54) METHOD FOR SELECTING AN OPERATING MODE AUTOMATICALLY

(75) Inventor: Jun Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 750 days.

(21) Appl. No.: 11/569,305

(22) PCT Filed: Apr. 20, 2006

(86) PCT No.: PCT/CN2006/000744

§ 371 (c)(1),
(2), (4) Date: Dec. 22, 2006

(87) PCT Pub. No.: WO2006/111094

PCT Pub. Date: Oct. 26, 2006

(65) Prior Publication Data

US 2008/0317107 A1    Dec. 25, 2008

(30) Foreign Application Priority Data

Apr. 21, 2005  (CN) .................. 2005 1 0066149

(51) Int. Cl.
*G06F 3/00* (2006.01)
(52) U.S. Cl. ................ 710/8; 710/10; 710/14
(58) Field of Classification Search ........ 710/8, 710/10, 14
See application file for complete search history.

(56) References Cited

U.S. PATENT DOCUMENTS

| | | | |
|---|---|---|---|
| 6,067,316 | A | 5/2000 | Amrany et al. |
| 6,751,254 | B1 | 6/2004 | Palm |
| 6,898,280 | B1 | 5/2005 | Dombkowski et al. |
| 6,950,459 | B1 | 9/2005 | Palm |
| 6,999,506 | B2 | 2/2006 | Palm |
| 7,058,123 | B2 | 6/2006 | Palm |
| 2004/0184520 | A1 | 9/2004 | Palm |
| 2005/0063322 | A1 | 3/2005 | Palm |

FOREIGN PATENT DOCUMENTS

| | | |
|---|---|---|
| CN | 1359224 A | 7/2002 |
| CN | 1242586 C | 2/2006 |
| EP | 1207673 A | 5/2002 |
| WO | WO 00/41354 A | 7/2000 |

*Primary Examiner*—Alford W Kindred
*Assistant Examiner*—David E Martinez
(74) *Attorney, Agent, or Firm*—Leydig, Voit & Mayer, Ltd.

(57) ABSTRACT

Embodiments of the present invention discloses a method for selecting an operating mode including the steps: a first station transmits downlink handshake signals to a second station; the second station acquires the information of the downlink handshake signals and transmits the acquired information to the first station; the first station selects an operating mode according to the received information. The downlink handshake signal includes the border tones in each mode and supported by both the first station and the second station. The present invention reduces the time of selecting an operating mode and further ensures that the xDSL network operating mode according with the requirements of practical services can be selected.

10 Claims, 1 Drawing Sheet

METHOD FOR SELECTING AN OPERATING MODE AUTOMATICALLY

CROSS-REFERENCE TO RELATED APPLICATIONS

The present application claims priority to Chinese Patent Application Serial No. 200510066149.0 by Jun Zhou, titled "Method for selecting an operating mode automatically," which is incorporated herein by reference in its entirety.

This application is the U.S. National Phase of International Patent Application No. PCT/CN2006/000744, filed on Apr. 20, 2006, which claims priority to Chinese Patent Application No. 200510066149.0, filed on Apr. 21, 2005, all of which are hereby incorporated by reference.

FIELD OF THE TECHNOLOGY

The present invention relates to network communication techniques, and more particularly, to a method for selecting an operating mode automatically in a Digital Subscriber Line (DSL) network.

BACKGROUND OF THE INVENTION

Along with the development of xDSL techniques, a series of xDSL standards related with xDSL techniques have been generated. A standard suit proposed by the International Telecommunication Union-Telecommunication Standardization Sector (ITU-T) specifically includes; the G.992.1/2 about Asymmetrical Digital Subscriber Loop (ADSL), the G.993.1 about Very High Speed Digital Subscriber Loop (VDSL) etc. Moreover, each standard also defines some appendixes for satisfying different requirements of services or regions. The relatively outstanding one is ADSL2 annex L, which can be called READSL2 as well.

With respect to convenience of application, the ADSL2+ system needs to be compatible with the ADSL2 and the READSL2. VDSL2 devices support the VDSL2, the VDSL1, the ADSL2+, the ADSL2 and the READSL2 in the same modem.

As there are too many modes which can be selected, in most cases, both central office unit of xDSL (xTU-C) and remote unit of xDSL support a multiple mode, that is, they may support the ADSL2+ annex A, the ADSL2 annex A, the ADSL2 annex L ADSL annex A and the G.lite annex A in the same modem, or support the VDSL2 annex A, the ADSL2+ annex A, the ADSL2 annex A, the ADSL2 annex L ADSL annex A and the G.lite annex A in the same modem. Thus, before practical service communications are implemented, it is needed to select the best operating mode automatically between the xTU-C and the xTU-R.

In the xDSL network, in order to select a standard from numerous ones, i.e., in order to select an operating mode corresponding to a technical standard, the ITU-T defines a corresponding handshake protocol, namely G.hs. The xTU-C and the xTU-R transmit configuring parameters at the handshake stage, and negotiate with each other to accomplish selecting an operating mode for the xDSL network.

At present, there are two primary methods for selecting an operating mode automatically.

The first method is to select an operating mode which maximizes the sum of a speed of uplink and a speed of downlink.

The specific implementing procedure of the first method includes: at the handshake stage, the xTU-C and the xTU-R carry out a first training, namely, they select randomly a mode to implement training. At the channel analyzing stage of the training, the xTU-C and the xTU-R transmit a Medley signal respectively to enable the other side to measure a Signal Noise Ratio (SNR) and then they exchange their own measured SNRs. The xTU-R transmits a table composed of SNRs of each tone acquired at the Medley stage to an xTu-c. The xTU-C uses the received table to calculate a possible speed of uplink and a possible speed of downlink in various modes respectively. The xTU-C selects an operating mode which maximizes the sum of the speed of uplink and the speed of downlink according to the calculated results. If the selected mode is different from the current training mode, the xTU-C will restart training with the selected mode.

It can be seen that: although the first method can select exactly the xDSL network operating mode according with the requirements of practical services, it usually takes two times of training for the modems to acquire the exact mode. Training twice means longer training time than the time of normal operation, that is, it needs a long time to select an optimal operating mode. In this way, the time of the handshake between a central office unit and a remote unit may exceed the upper limit for the time of handshake required by the system. In addition, since it is needed to carry on the second training, the implementing procedure is relatively complicated.

The second method is to select a mode according to an uplink handshake signal.

The specific implementing procedure of the second method includes: at the handshake stage, the xTU-C which is responsible for mode selection estimates attenuation of the uplink signal sent from, the xTU-R according to the receiving level of uplink handshake signal and its transitting level, and deduces a length of a line and selects a corresponding operating mode according to preferred parameters of the known arts. For instance, the ADSL2+ is used within 2.8 km, the ADSL2 is used between 2.8 km and 3.8 km and the ADSL2 annex L is used if above 3.8 km.

Although the procedure of employing the second method to select an operating mode is simple and does not need to waste the time caused by the handshake procedure, the method is too coarse because it deduces the length of the line according to the uplink handshake signal and selects the operating mode according to experiences. As the attenuation of the uplink signal can not reliably express the attenuation of the downlink signal and further deduce the capacity, hence, this method of selecting an operating mode may fail to propose an optimal operation mode.

SUMMARY OF THE INVENTION

The embodiments of the present invention provide a method for selecting an operating mode automatically so that the time of selecting an operating mode can be reduced and an xDSL network operating mode according with practical service requirements can be selected.

The technical solution in accordance with the embodiments of the present invention is achieved as follows:

a method for selecting an operating mode, includes the steps:

a first station transmits downlink handshake signals to a second station;

the second station acquires information of the downlink handshake signals and transmitting the acquired information to the first station;

the first station, according to the received information, selects an operating mode.

The step of the second station acquiring information and transmitting the information includes the following steps:

the second station acquires Signal Noise Ratios (SNRs) of the received border tones in each mode;

the second station respectively determines whether each of the acquired SNRs accords with a predetermined requirement for the SNRs, if each of the acquired SNRs accords with the requirement, determines that the border tone corresponding to the SNR which accords with the requirement is usable for carrying data bit; if each of the acquired SNRs does not accord with the requirement, determines that the border tone corresponding to the SNR which accords with the requirement is unusable for carrying data bit;

the second station transmits the information about whether the border tones in each mode are usable for carrying data bit to the first station;

the step of the first station selecting an operating mode includes: the first station selects an operating mode according to the received information about whether the border tones in each mode are usable for carrying data bit.

It can be seen from the technical solution provided by the embodiments of the present invention that, the implementation of the present invention makes it possible to implement operating mode selection according to real conditions of lines during the procedure of selecting an operating mode. Moreover, the best operating mode can be selected after just the first training. Accordingly, the embodiments of the present invention reduces the time of selecting an operating mode and further ensures that the operating mode of the xDSL network according with the requirements of practical services can be selected.

EMBODIMENTS OF THE INVENTION

Figure 1:
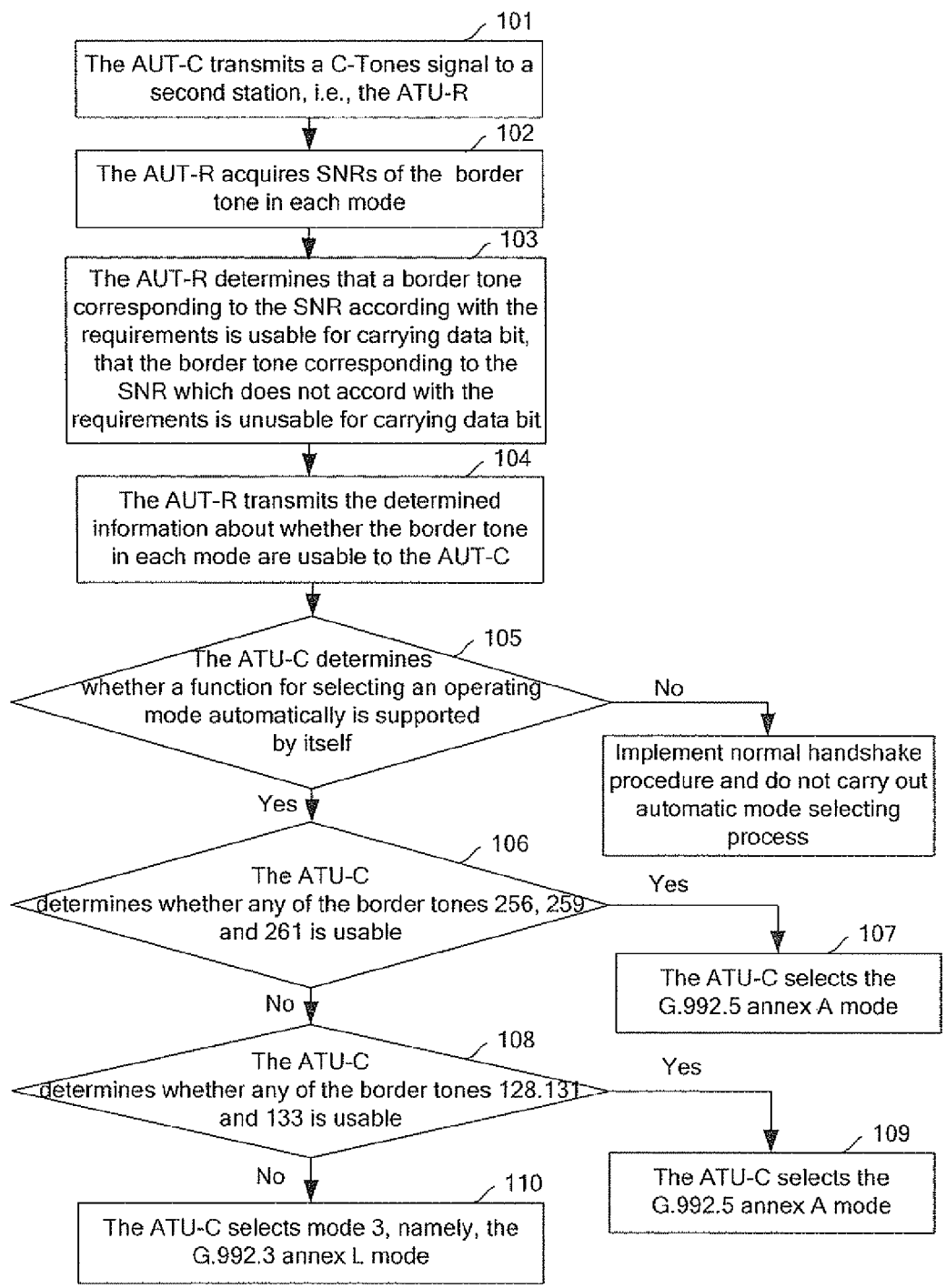
FIG. 1 is a flowchart shows an embodiment in accordance with the present invention.

The technical solution of the present invention is that: a first station transmits downlink handshake signals to a second station; the second station acquires information of the downlink handshake signal and transmits the acquired information to the first station; the first station selects an operating mode according to the received information.

The downlink handshake signals may include border tones in each mode, supported by both the first station and the second station, or may include all tones in each mode, supported by both the first station and the second station.

In order to make the technical solution of the embodiments of the present invention clearer, a detailed description of the present invention is hereinafter given with reference to the attached drawings and embodiment examples.

At present, in the xDSL network, the operating mode supported by both the stations may be:

mode 1: the G.992.5 Annex A non-overlapped downstream;

mode 2: the G.992.3 Annex A non-overlapped downstream;

mode 3: the G.992.3 Annex A non-overlapped downstream;

or, in the xDSL network, the operating mode supported by both the stations can also be:

the ADSL2+ annex B and the ADSL2 annex B.

Or, in the xDSL network, the operating mode supported by both the stations can still be:

the VDSL2 and the above-mentioned mode 1 to mode 3; or the VDSL2 and the above-mentioned ADSL2+ annex B and the ADSL2 annex B.

Hereinafter, in the xDSL network, two stations supporting the above-mentioned mode 1 to mode 3 at the same time is taken as an example to illustrate the detailed implementing procedure of the embodiments of the present invention.

The inner-band frequencies in accordance with the above-mentioned mode 1 to mode 3 respectively are:

mode 1: a downstream band width from 138 KHz to 2,280 KHz;

mode 2: a downstream band width from 138 KHz to 1,104 KHz;

mode 3: a wide band upstream, and a downstream band from 138 KHz to 552 KHz.

In the xDSL network, the uplink frequencies according to the mode 2, i.e., the G.992.3 annex A, and the mode 1, that is, the G.992.5 annex A, are the same. With respect to the mode 3, i.e., the G.992.3 annex L, the choice of using mode 3 is normally due to the insufficient of downlink rate in other two modes. Therefore, it can be seen from the descriptions of the downlink frequencies in accordance with the mode 1 to mode 3 that, the mode selection can be directly determined according to the bearer abilities of the downlink frequencies.

The only difference among the mode 1 to mode 3 is the differences in a frequency upper-limit and an inner-band power spectral density mask (PSD mask). Thus, the operating mode can be selected according to whether a frequency point near the border is usable for carrying data bit.

Taking ADSL network for example, the method according to the embodiments of the present invention specifically includes: at the beginning of the handshake stage, i.e., the C-Tones stage, the first station needing to select an operating mode, namely, the ATU-C, besides transmitting the tones 40, 56 and 64, transmits the border tones 256, 259 and 261 of the above-mentioned mode 1 and mode 2, and transmits the border tones 128, 131 and 133 of the above-mentioned mode 1 and mode 3. Each tone such as tones 40, 56, 256, 133 and the like, is a serial number of the tone and the frequency corresponding to the tone serial number is a result of the tone serial number multiplying 4.3125 KHz. For example, the frequency corresponding to the tone 40 is 172.5 KHz, calculated by the formula: 40 4.3125 KHz=172.5 KHz.

Practically, at the C-Tones stage, the first station, i.e., the ATU-C may transmit other border tones or transmit all tones in each mode. A general principle is, transmitting the corresponding tones in every mode, to ensure that the normal work in each mode can be judged effectively. Additionally, in order to make it convenient to measure power and calculate, the tone of each frequency point preferably adopts the power spectral density same as the one adopted by the tones of the above-mentioned three frequency points for transmitting.

The second station, i.e., the ATU-R, upon receiving these tones, calculates respectively the received power, determines whether these tones can be used to carry data bit (namely the usable information of each tone), and transmits the information about whether these tones can be used to bear information to the first station, i.e., the ATU-C, through a Capability List and Request (CLR) message.

Base on the above-mentioned analysis, the whole mode selection flow of the method according to the preferred embodiment of present invention, in the detailed implementing procedure, as shown in FIG. 1, specifically includes:

Step 101: at transmitting C-tones stage in the handshake procedure, a first station needing to select an operating mode, i.e., the AUT-C, transmits the C-Tones signal to a second station, i.e., the ATU-R.

Herein, the C-Tones signal not only includes the tones 40, 56 and 64 transmitted according to the existing method, but also includes the downlink handshake signal, i.e., the border tones of the mode 1 and the mode 2 and further the mode 2 and the mode 3, such as, 256, 259, 261, 128, 131 and 133.

In this step, the AUT-C may only transmit the border tones of the mode 1 and the mode 2 and further the mode 2 and the mode 3, such as, 128, 131, 133, 256, 259 and 261, or may transmit all tones in the mode 1, mode 2 and mode 3 including the above-mentioned border tones.

In addition, in order to enable the ATU-R to measure an SNR of a border frequency point effectively in the following steps, in this step, the border tones 128, 131, 133, 256, 259 and 261 in the mode 1 and the mode 2 and further the mode 2 and the mode 3 can be transmitted once every predetermined time. For instance, a transmitting method using maximum power to transmit tones within 25 ms and becoming silent (not to transmit tones) in next 25 ms can be adopted.

Step 102: the ATU-R acquires the SNRs of the border tones in each mode.

Herein, if an interval-transmitting method is adopted in the Step 101, thus, in this step, the AUT-R, when receiving the border tones in each mode each time, can measure the SNRs of the border tones in each mode without exception. Next, the mean of the results of every measurement is chosen to be the SNR of the border tones in each mode.

Step 103: the ATU-R respectively determines whether the acquired each SNR accords with a predetermined requirement for the SNR. If an SNR accords with the requirement, it is determined that the border tone corresponding to the SNR according with the requirement is usable; if it does not accord with the requirement, it is determined that the border tone corresponding to the SNR according with the requirement is unusable.

Step 104: the ATU-R transmits the information about whether the border tones in each mode are usable to the AUT-C.

Step 105: the AUT-C determines whether the function of selecting operating mode automatically provided by the preferred embodiment of present invention is supported by itself. If the function is supported by itself, perform Step 106; otherwise, perform normal handshake procedure without automatic mode selection process and terminate the current procedure.

Herein, the ATU-C selects an operating mode according to the received information about whether the border tones in each mode are usable. That is, the ATU-C, according to the order from the highest speed to the lowest speed, determines in turn whether the border tones in each operating mode corresponding to each transmission speed are usable until the usable border tone is determined. The first station selects the operating mode corresponding to the determined usable border tone. Its detailed implementing procedure is from Step 106 to Step 110 hereunder.

Step 106: the ATU-C determines whether any of the border tones 256, 259 and 261 in the operating mode corresponding to the highest transmission speed is usable, that is, determines whether the mode 1 can implement normal information transmission process. If the mode 1 can implement the process, perform Step 107; otherwise, perform Step 108.

Step 107: the ATU-C selects mode 1, i.e., the G.992.5 annex A mode as the operating mode of the current communications and terminates the current procedure.

Step 108: the ATU-C determines whether any of the border tones 128, 131 and 133 in the operating mode corresponding to the secondary highest transmission speed is usable, that is, determines whether the mode 2 can implement normal information transmission process. If the mode 2 can implement the process, perform Step 109, otherwise, perform Step 110.

Step 109: the ATU-C selects mode 2, i.e., the G.992.3 annex A mode as the operating mode of the current communications and terminates the current procedure.

Step 110: the ATU-C selects the mode 3, i.e., the G.992.3 annex L mode.

In the xDSL network, when the combination of the operating modes supported by the two stations simultaneously is a certain one of other combinations, the procedure of implementing the operation of selecting an operation mode automatically is the same as the principle of the above-mentioned procedure described by the above-mentioned embodiment.

The foregoing descriptions are only preferred embodiments of the present invention and are not for use in limiting the protection scope thereof. Any modification, equivalent replacement or improvement made under the spirit and principles of the present invention is included in the protection scope of the claims of this invention.

The invention claimed is:

1. A method for selecting an operating mode, comprising:
a first station transmitting downlink handshake signals to a second station, the downlink handshake signals comprise tones corresponding to a border tone of each operating mode, the difference between the tones and the border tone of the operating mode is less than a predetermined range;
the second station acquiring Signal Noise Ratios (SNRs) of the tones received; respectively determining whether the tone is usable for carrying data bits according to the SNR corresponding to the tone; and transmitting information about whether the tones are usable for carrying data bits to the first station;
the first station, according to the received information about whether the tones are usable for carrying data bits, selecting an operating mode.

2. The method of claim 1, wherein the step of the second station determining whether the tone is usable for carrying bits according to the SNR corresponding to the tone comprises:
the second station respectively determining whether each of the acquired SNRs accords with a predetermined requirement for the SNRs, if the acquired SNRs accords with the requirement, determining that the tone corresponding to the SNR which accords with the requirement is usable for carrying the data bits; if the acquired SNRs does not accord with the requirement, determining that the tone corresponding to the SNR which does not accord with the requirement is unusable for carrying the data bits.

3. The method of claim 2, wherein the step of the first station selecting an operating mode comprises: the first station, according to an order from the highest frequency to the lowest frequency, determining in turn whether the tones in each operating mode corresponding to each transmission frequency are usable for carrying the data bits, until the usable tone is determined; the first station selecting the operating mode corresponding to the determined usable tone.

4. The method of claim 3, wherein the first station and the second station both supports the G.992.5 annex A mode, the G.992.3 annex A mode and G.992.3 annex L mode;
the tones comprises: the border tones 256, 259 and 261 in the G.992.5 annex A mode and the G.992.3 annex A mode, and the border tones 128, 131 and 133 in the G.992.3 annex A mode and the G.992.3 annex L mode;
the step of the first station selecting an operating mode comprises:
the first station determining whether any of the border tones 256, 259 and 261 is usable for carrying the data bits, if any of them is usable, selecting the G.992.5 annex A mode; otherwise, the first station determining whether any of the border tones 128, 131 and 133 is usable for carrying the data bits, if any of them is usable, selecting the G.992.3 annex A mode; otherwise, selecting the G.992.3 annex L mode.

5. The method of claim 1, wherein the first station transmits the tones to the second station and the first station is shut down, every predetermined time;

wherein the step of the second station acquiring SNRs of the received tones in each operating mode comprises: the second station, when receiving a tone in any operating mode each time, measuring the SNR of the tone in the operating mode without exception, and setting the SNR mean of every measurement as the SNR of the tone in the operating mode.

6. The method of claim 1, wherein the step of transmitting the information about whether the tones are usable for carrying the data bits to the first station comprises: the second station transmitting the information about whether the tones are usable for carrying the data bits to the first station by a Capability List and Request (CLR) message.

7. The method of claim 1, wherein the step of a first station transmitting downlink handshake signals to a second station is performed at an initialization stage of handshake procedure, which is the transmitting C-tones stage in the handshake procedure.

8. The method of claim 7, wherein the step of the first station transmitting the downlink handshake signal to the second station comprises: at the transmitting C-tones stage, the first station using a power spectral density for transmitting the original C-tones defined in G.994.1 to transmit the tones in each operating mode.

9. The method of claim 1, wherein the step of a first station transmitting downlink handshake signals to a second station is performed at an initialization stage of handshake procedure, which is the transmitting C-tones stage in the handshake procedure.

10. The method of claim 9, wherein the step of the first station transmitting the downlink handshake signal to the second station comprises: at the transmitting C-tones stage, the first station using a power spectral density for transmitting the original C-tones defined in G.994.1 to transmit the tones in each operating mode.

* * * * *